United States Patent

Tewfik et al.

[11] Patent Number: 6,031,914
[45] Date of Patent: Feb. 29, 2000

[54] METHOD AND APPARATUS FOR EMBEDDING DATA, INCLUDING WATERMARKS, IN HUMAN PERCEPTIBLE IMAGES

[75] Inventors: Ahmed H. Tewfik, Edina; Mitchell D. Swanson, Minneapolis; Bin Zhu, St. Paul, all of Minn.

[73] Assignee: Regents of the University of Minnesota, Minneapolis, Minn.

[21] Appl. No.: 08/918,122

[22] Filed: Aug. 27, 1997

Related U.S. Application Data

[60] Provisional application No. 60/024,979, Aug. 30, 1996, and provisional application No. 60/050,587, Jun. 24, 1997.

[51] Int. Cl.$^7$ .................................................. G09C 3/00
[52] U.S. Cl. .............................. 380/54; 341/4; 341/8; 382/283
[58] Field of Search ..................... 380/4, 5, 6, 7, 380/9, 10, 14, 17, 20, 54, 59; 704/203; 707/104; 341/4, 8, 9, 56–67; 348/25–30, 334, 444, 460–467, 473–475, 586–592; 382/100–117, 140, 162–167, 173–180, 232, 283

[56] References Cited

U.S. PATENT DOCUMENTS

| | | | |
|---|---|---|---|
| 3,395,024 | 7/1968 | Ear ............................................. | 99/169 |
| 4,313,197 | 1/1982 | Maxemchuk ............................. | 370/111 |
| 4,425,661 | 1/1984 | Moses et al. ............................. | 375/1 |
| 4,495,620 | 1/1985 | Steele et al. ............................. | 370/118 |
| 4,969,041 | 11/1990 | O'Grady et al. ......................... | 358/142 |
| 5,010,405 | 4/1991 | Schreiber et al. ....................... | 358/141 |
| 5,060,262 | 10/1991 | Bevins, Jr. et al. ...................... | 380/19 |
| 5,285,498 | 2/1994 | Johnston ................................... | 381/2 |
| 5,315,098 | 5/1994 | Tow .......................................... | 235/494 |
| 5,319,735 | 6/1994 | Preuss et al. ............................ | 395/2.14 |

(List continued on next page.)

FOREIGN PATENT DOCUMENTS

| | | | |
|---|---|---|---|
| 0 635 798 A1 | 1/1995 | European Pat. Off. ........ | G06F 17/30 |
| 0 657 831 A1 | 6/1995 | European Pat. Off. ........ | G06F 17/30 |
| 0 581 317 A2 | 7/1993 | Germany ................................. | 380/54 |

OTHER PUBLICATIONS

Swanson, M.D., et al., "Robust Data Hiding for Images", 4 p.

Swanson, M.D., et al., "Transparent Robust Image Watermaking", Proceedings of the IEEE International Conference on Image Processing, 4 p., (1996).

Zhu, B., et al., "Transparet Robust Authentication and Distortion Measurement Technique for Images", 4 p.

Aizawa, K., "Model–Based Image Coding", *Proceedings of the SPIE, Visual Communications and Image Processing '94, vol. 2308*, Chicago, IL, 1035–1049 (Sep. 25–29, 1994).

(List continued on next page.)

*Primary Examiner*—Tod R. Swann
*Assistant Examiner*—Paul E. Callahan
*Attorney, Agent, or Firm*—Schwegman, Lundberg Woesnner & Kluth P.A.

[57] ABSTRACT

A technique for hiding of data, including watermarks, in human-perceptible images, that is, image host data, is disclosed. In one embodiment a method comprises three steps. In the first step, data to be embedded is inputted. In the case of a watermark, this data is a unique signature, and may be a pseudo-noise (PN) code. In the case of hidden data to be embedded in the host data, this data is the hidden data itself, or the hidden data as spread against the frequency spectrum by a pseudo-noise (PN) code. In the second step, the inputted data is embedded within the host data, in accordance with a perceptual mask of the host data. The perceptual mask determines the optimal locations within the host data to insert the inputted data. In the case of images, these optimal locations are determined by reference to the human visual system. In the third step, the host data, with the embedded data, is further masked by a non-frequency mask. In the case of image data, the non-frequency mask is a spatial mask.

23 Claims, 4 Drawing Sheets

U.S. PATENT DOCUMENTS

| | | | |
|---|---|---|---|
| 5,325,290 | 6/1994 | Cauffman et al. | 364/401 |
| 5,379,345 | 1/1995 | Greenberg | 380/23 |
| 5,386,240 | 1/1995 | Hori | 348/473 |
| 5,404,377 | 4/1995 | Moses | 375/200 |
| 5,450,490 | 9/1995 | Jensen et al. | 380/6 |
| 5,461,426 | 10/1995 | Limberg et al. | 348/475 |
| 5,465,269 | 11/1995 | Schaffner et al. | 375/200 |
| 5,465,308 | 11/1995 | Hutcheson et al. | 382/159 |
| 5,473,631 | 12/1995 | Moses | 375/202 |
| 5,515,296 | 5/1996 | Agarwal | 364/514 R |
| 5,530,759 | 6/1996 | Braudaway et al. | 380/54 |
| 5,579,471 | 11/1996 | Barber et al. | 395/326 |
| 5,583,941 | 12/1996 | Yoshida et al. | 380/51 |
| 5,606,609 | 2/1997 | Houser et al. | 380/4 |
| 5,613,004 | 3/1997 | Cooperman et al. | 380/28 |
| 5,646,997 | 7/1997 | Barton | 380/23 |
| 5,687,236 | 11/1997 | Moskowitz et al. | 380/28 |
| 5,710,719 | 1/1998 | Houle | 364/514 R |
| 5,710,916 | 1/1998 | Barbaraet al. | 395/609 |
| 5,809,139 | 9/1998 | Girod et al. | 380/5 |
| 5,848,155 | 12/1998 | Cox | 380/4 |
| 5,850,481 | 12/1998 | Rhoads | 382/232 |
| 5,859,920 | 1/1999 | Daly et al. | 382/115 |

OTHER PUBLICATIONS

Baritaud, T., et al., "On the Security of the Permuted Kernel Indentification Scheme", *Proceedings of the 12th Annual International Cryptology Conference*, Advances in Cryptology—CRYPTO '92, Brickell, E.F., (ed.), Santa Barbara, CA, 305–311 (Aug. 16–20, 1992).

Bender, W., et al., "Techniques for Data Hiding", *IBM Systems Journal*, 35, 313–336 (1996).

Bender, W., et al., "Techniques for Data Hiding", *SPIE*, 2420, 164–173 (1995).

Boland, F.M., et al., "Watermarking Digital Images for Copyright Protection", *IEE International Conference on Image Processing and Its Applications*, Edinburgh, Scotland, 326–330 (Jul. 4–6, 1995).

Boney, L., et al., "Digital Watermarks for Audio Signals", *Proceedings of the 1996 IEEE International Conference on Multimedia Computing and Systems*, Multimedia '96, Hiroshima, Japan, 473–480 (Jun. 1996).

Bors, A.G., et al., "Image Watermarking Using DCT Domain Constraints", *Proceedings of the 1996 IEEE International Conference on Image Processing, vol. III*, Lausanne, Switzerland, 231–234 (Sep. 16–19, 1996).

Bouman, C., et al., "Multiple Resolution Segmentation of Textured Images", *IEEE Transactions on Pattern Analysis and Machine Intelligence*, 13, 99–113 (Feb. 1991).

Cawkell, A.E., "Picture–Queries and Picture Databases", *The Journal of Information Science*, 19, 409–423 (1993).

Chalom, E., et al., "Segmentation of an Image Sequence Using Multi–Dimensional Image Attributes", *Proceedings of the 1996 IEEE International Conference on Image Processing, vol. II*, Lausanne, Switzerland, 525–528 (Sep. 16–19, 1996).

Chan, W.–Y., et al., "Generalized Product Code Vector Quantization: A Family of Efficient Techniques for Signal Compression", *Digital Signal Processing*, 4, 95–126 (1994).

Chang, S.–F., "Compressed–Domain Techniques for Image/Video Indexing and Manipulation", *Proceedings of the 1995 IEEE International Conference on Image Processing, vol. 1*, Washington, D.C., 314–317 (Oct. 23–26, 1995).

Chang, S.–F., et al., "Transform Coding of Arbitrarily–Shaped Image Segments", *Proceedings of the ACM, Multimedia 93*, Anaheim, CA, 83–90 (Aug. 1–6, 1993).

Chitprasert, B., et al., "Human Visual Weighted Progressive Image Transmission", *IEEE Transactions on Communications*, 38, 1040–1044 (Jul. 1990).

Corset, I., et al., "MPEG–4: Very Low Bit Rate Coding for Multimedia Applications", *Proceedings of the SPIE, Visual Communications and Image Processing '94, vol. 2308*, Chicago, IL, 1065–1073 (Sep. 25–29, 1994).

Cox, I.J., et al., "Secure Spread Spectrum Watermarking for Images, Audio and Video", *Proceedings of the 1996 IEEE International Conference on Image Processing, vol. III*, Lausanne, Switzerland, 243–246 (Sep. 16–19, 1996).

Craver, S., et al., "Can Invisible Watermarks Resolve Rightful Ownership?", *IBM Research Technical Report, RC 20509, IBM CyberJournal*, 23 p. (Jul. 25, 1996).

Daubechies, I., et al., "Orthonormal Bases of Compactly Supported Wavelets", *Communications on Pure and Applied Mathematics*, XLI, 909–996 (Oct. 1988).

Faloutsos, C., et al., "Signature Files: An Access Method for Documents and Its Analytical Performance Evaluation", *ACM Transactions on Office Information Systems*, 2, 267–288 (Oct. 1984).

Flickner, M., et al., "Query by Image and Video Content: The QBIC System", *Computer*, 28, 23–32 (Sep. 1995).

Gary, J.E., et al., "Shape Similarity–Based Retrieval in Image Database Systems", *Proceedings of the SPIE, Image Storage and Retrieval Systems, vol. 1662*, San Jose, CA, 2–8 (Feb. 13–14, 1992).

Girod, B., "The Information Theoretical Significance of Spatial and Temporal Masking in Video Signals", *Proceedings of the SPIE, Human Vision, Visual Processing and Digital Display, vol. 1077*, 178–187 (1989).

Gruber, J., "Smart Paper", *Wired*, 2, 46 (Dec. 1994).

Gudivada, V.N., et al., "Content–Based Image Retrieval Systems", *Computer*, 28, 18–22 (Sep. 1995).

Hartung, F., et al., "Digital Watermarking of Raw and Compressed Video", *SPIE*, 2952, 205–213 (Oct. 1996).

Hirata, K., et al., "Rough Sketch–Based Image Information Retrieval", *NEC Research & Development*, 34, 463–473 (Apr. 1993).

Hirotsugu, K., "An Image Digital Signature System with ZKIP for the Graph Isomorphism", *Proceedings of the 1996 IEEE International Conference on Image Processing, vol. III*, Lausanne, Switzerland, 247–250 (Sep. 16–19, (1996).

Hsu, C.–T., et al., "Hidden Signatures in Images", *Proceedings of the 1996 IEEE International Conference on Image Processing, vol. III*, Lausanne, Switzerland, 223–226 (Spe. 16–19, 1996).

Huang, Z., et al., "Affine–Invariant B–Spline Moments for Curve Matching", *IEEE Transactions on Image Processing*, 5, 1473–1480 (Oct. 1996).

Huffman, D.A., "A Method for the Construcion of Minimum–Redundancy Codes", *Proceedings of the IRE*, 40, 1098–1101 (1952).

Jacobs, C.E., et al., "Fast Multiresolution Image Querying", *Proceedings of the ACM, Siggraph Conference on Computer Graphics*, Los Angeles, CA, 277–286 (1995).

Jayant, N., et al., "Signal Compression Based on Models of Human Perception", *Proceedings of the IEEE*, 81, 1385–1422 (Oct. 1993).

Johnson, J.D., et al., "Wideband Coding—Perceptual Considerations for Speech and Music", In: *Advances in Speech Signal Processing*, Furui, S., et al., (eds.), Dekker, New York, pp. 109–140 (1992).

Le Gall, D., "MPEG: A Video Compression Standard for Multimedia Applications", *Communications of the ACM*, 34, 46–58 (Apr. 1991).

Legge, G.E., et al., "Contrast Masking in Human Vision", *The Journal of the Optical Society of America*, 70, 1458–1471 (Dec. 1980).

Lin, H.-C., et al., "Color Image Retrieval Based on Hidden Markov Models", *Proceedings of the 1995 IEEE International Conference on Image Processing, vol. 1*, Washington, D.C., 342–345 (1995).

Macq, B.M., et al., "Cryptology for Digital TV Broadcasting", *Proceedings of the IEEE*, 83, 944–957 (Jun. 1995).

Manjunath, B.S., et al., "Browsing Large Satellite and Aerial Photographs", *Proceedings of the 1996 IEEE International Conference on Image Processing, vol. II*, Lausanne, Switzerland, 765–768 (Sep. 16–19, 1996).

Matsui, K. et al., "Video–Steganography: How to Secretly Embed a Signature in a Picture", *IMA Intellectual Property Project Proceedings, vol. 1*, 187–206 (Jan. 1994).

Nam, J., et al., "Combined Audio and Visual Streams Analysis for Video Sequence Segmentation", Proceedings of the 1997 IEEE International Conference on Acoustics, Speech and Signal Processing, vol. IV, Munich, Germany, 2665–2668 (Apr. 21–24, 1997).

Niblack, W., et al., "The QBIC Project: Querying Images by Content Using Color, Texture and Shape", *Proceedings of the SPIE, Storage and Retrieval for Image and Video Databases, vol. 1908*, 173–187 (1993).

Nill, N.B., "A Visual Model Weighted Cosine Transform for Image Compression and Quality Assessment", *IEEE Transactions on Communications, COM–33*, 551–557 (Jun. 1985).

Noll, P., "Wideband Speech and Audio Coding", *IEEE Communications Magazine*, 31, 34–44 (Nov. 1993).

O Ruanaidh, J.J.K., et al., "Phase Watermarking of Digital Images", *Proceedings of the 1996 IEEE International Conference on Image Processing, vol. III*, Lausanne, Switzerland, 239–242 (Sep. 16–19, 1996).

Pitas, I., "A Method for Signature Casting on Digital Images", *Proceedings of the 1996 IEEE International Conference on Image Processing, vol. III*, Lausanne, Switzerland, 215–218 (Sep. 16–19, 1996).

Rioul, O., et al., "Wavelets and Signal Processing", *IEEE Signal Processing Magazine*, 8, 14–38 (Oct. 1991).

Rivest, R.L., "Cryptography", In: *Handbook of Theoretical Computer Sciences, vol. A*, Van Leeuwen, J., (ed.), pp. 717–755 (1990).

Rivest, R.L., et al., "A Method for Obtaining Digital Signatures and Public–Key Cryptosystems", *Communications of the ACM*, 21, 120–126 (Feb. 1978).

Smith, J.P., "Authentication of Digital Medical Images with Digital Signature Technology", *Radiology*, 194, 771–774 (Mar. 1995).

Smith, J.R., et al., "Modulation and Information Hiding in Images", *Information Hiding*, Proceedings of the First Int. Workshop, Anderson, R., (ed.), Cambridge, U.K., 207–226 (May 30–Jun. 1, 1996).

Srihari, R.K., "Combining Text and Image Information in Content–Based Retrieval", *Proceedings of the 1995 IEEE International Conference on Image Processing*, Washington, D.C., 326–328 (Oct. 23–26, 1995).

Strang, G., "Wavelets and Dilation Equations: A Brief Introduction", *SIAM Review*, 31, 614–627 (Dec. 1989).

Swain, M.J., et al., "Color Indexing", *International Journal of Computer Vision*, 7, 11–32 (1991).

Tanaka, K., et al., "Embedding Secret Information into a Dithered Multi–Level Image", *1990 IEEE Military Communications Conference, vol. 1*, "Milcom 90: A New Era," Monterey, CA, 216–220 (Sep. 30–Oct. 3, 1990).

van Schyndel, R.G., et al., "A Digital Watermark", *Proceedings of the IEEE, ICIP–94, vol. II*, Austin, TX, 86–90 (Nov. 13–16, 1994).

Voyatzis, G., et al., "Applications of Toral Automorphisms in Image Watermarking", *Proceedings of the 1996 IEEE International Conference on Image Processing, vol. II*, Lausanne, Switzerland, 237–240 (Sep. 16–19, 1996).

Wallace, G.K., "The JPEG Still Picture Compression Standard", *Communications of the ACM*, 34, 30–44 (Apr. 1991).

Witten, I.H., et al., "Arithmetic Coding for Data Compression", *Communications of the ACM*, 30, 520–540 (Jun. 1987).

Wolfgang, R.B., et al., "A Watermark for Digital Images", *Proceedings of the 1996 IEEE International Conference on Image Processing, vol. III*, Lausanne, Switzerland, 219–222 (Sep. 16–19, 1996).

Wunsch, P., et al., "Wavelet Descriptors for Multiresolution Recognition of Handprinted Characters", *Pattern Recognition*, 28, 1237–1249 (Aug. 1995).

Zhu, B., et al., "Image Coding with Mixed Representations and Visual Masking", *Proceedings of the 1995 IEEE International Conference on Acoustics, Speech and Signal Processing, vol. 4*, Detroit, MI, 2327–2330 (May 9–12, 1995).

Zhu, B., et al., "Low Bit Rate Near–Transparent Image Coding", *Proceedings of the SPIE, International Conference on Wavelet Applications for Dual Use, vol. 2491*, Orlando, FL, 173–184 (1995).

Zhu, S.C., et al., "Regoin Competition: Unifying Snakes, Region Growing, Energy/Bayes/MDL for Multi–band Image Separation", *Proceedings of the IEEE Fifth International Conference on Computer Vision*, Massachusetts Institute of Technology, Cambridge, MA, 416–423 (Jun. 20–23, 1995).

Ziv, J., et al., "A Universal Algorithm for Sequential Data Compression", *IEEE Transactions on Information Theory, IT–23*, 337–343 (May 1977).

METHOD AND APPARATUS FOR EMBEDDING DATA, INCLUDING WATERMARKS, IN HUMAN PERCEPTIBLE IMAGES

RELATED DOCUMENTS

This application claims the benefit of U.S. Provisional Application No. 60/024,979, filed Aug. 30, 1996, which is hereby incorporated by reference. U.S. Provisional Application No. 60/050,587, filed Jun. 24, 1997, the benefit of which is also claimed, is also hereby incorporated by reference. Co-filed applications entitled "Method and Apparatus for Embedding Data, Including Watermarks, in Human Perceptible Sounds," application Ser. No. 08/918,891 Aug. 27, 1997 "Method and Apparatus for Video Watermarking," application Ser. No. 08/918,125 Aug. 27, 1997 and "Method and Apparatus for Scene-Based Video Watermarking," application ser. No. 08/921,931 Aug. 27, 1997 and "Digital Watermarking to Resolve Multiple claims of Ownership" application Ser. No. 08/918,126 Aug. 27, 1997 are also hereby incorporated by reference.

STATEMENT REGARDING GOVERNMENT RIGHTS

The present invention was made with government support by AFOSR under grant AF/F49620-94-1-0461 ARPA grant AF/F49620-93-1-0558 and NSF grant INT-9406954. The Government has certain rights in this invention.

FIELD OF THE INVENTION

This invention relates generally to techniques for embedding data such as watermarks, signatures and captions in digital data, and more particularly to embedding such data in human perceptible images.

BACKGROUND OF THE INVENTION

Advances in information systems and networked databases continue to spur rapid growth in digital media, e.g., audio, image and video. This is due, in part, to highly efficient manipulation, reproduction, and access afforded by digital media. Data hiding is the process of encoding extra information in digital data, such as video, images or sounds, by making small modifications to the data. Hiding information in images may be used to supplement an image or sound with additional information, or verify the integrity of the image or sound. The hidden information itself may be text, audio or image data or hyperlinks. For example, text captions may be used to label faces and buildings in an image. A short audio clip may associate a train whistle with an image of a locomotive. A hyperlink may join an image region to another document or data source.

The embedded data typically remains with the image when it is stored or transmitted. The embedded data may be meant to be extracted by an end user, or hidden to the end user. In the former instance, for example, a consumer may extract the embedded data and use it to satisfy an information need. In the latter instance, the embedded data may be a watermark. Watermarking is a technique used to label digital media by hiding copyright or other information into the underlying data. Unlike encryption, for example, which is used to restrict access to data, watermarking is employed to provide solid proof of authorship. Like data hiding generally, the watermark remains with the media. However, unlike data hiding generally, with watermarking the user cannot access the embedded information (i.e., the watermark).

Data hiding in general, and watermarking in particular, typically must satisfy the following requirements to be useful: they must be invisible, and they must be robust. Although other criteria may be important (such as statistical invisibility, the support for multiple data embeddings and self-clocking), the invisibility and the robustness of the resulting data are most important. The first requirement is that the hidden data remain invisible in the case where the host data is image data.

Otherwise, the quality of the image may degrade.

The second requirement, robustness, relates to the survivability of the hidden data in light of the manipulation of the media in which it is embedded. Typically, image data is subject to signal processing operations such as filtering, resampling, compression, noise, cropping, audio-to-digital and subsequent digital-to-audio conversion, etc. For example, a small section of an image may be cropped so only that section is used. An image may also be compressed by a technique such as JPEG so that its transmission is completed in a shorter period of time. Because the host data will invariably be subject to such manipulation, the embedded data must be robust. That is, the embedded data must able to survive after the host data has been subjected to signal processing operations.

Several data hiding techniques are found in the prior art. The most common approaches modify the least significant bits (LSB) of an image based on the assumption that the LSB data are insignificant. In one particular technique, the LSB of data is replaced with a pseudo-noise (PN) sequence, while in another technique, a PN sequence is added to the LSB of the data. A data hiding method called "Patchwork" for image data chooses n pairs ($a_i$, $b_i$) of points within an image and increase the brightness of $a_i$ by one unit while simultaneously decreasing the brightness of $b_i$. However, any approach which only modifies the LSB data is highly sensitive to noise and is easily destroyed. Furthermore, image quality may be degraded by the hidden data.

Thus, there is a need for a data hiding and watermarking technique that is invisible in the case of image data and has the maximum robustness to ensure that the embedded data survives both legitimate and illegitimate data manipulation.

SUMMARY OF THE INVENTION

The present invention provides for the hiding of data, including watermarks, in human-perceptible images, that is, image host data. The present invention employs perceptual masking models to determine the optimal locations within host data to insert the hidden data or watermark. In one embodiment of the invention, a method comprises three steps. In the first step, data to be embedded is inputted. In the case of a watermark, this data is a unique signature, and may be a pseudo-noise (PN) code generated by the invention. In the case of hidden data to be embedded in the host data, this data is the hidden data itself, or the hidden data as spread against the frequency spectrum by a pseudo-noise (PN) code.

In the second step, the inputted data is embedded within the host data, in accordance with a perceptual mask of the host data. The perceptual mask determines the optimal locations within the host data to insert the inputted data. In the case of images, these optimal locations are determined by reference to the human visual system. Any model mimicking the human visual system can be used under the present invention.

Finally, in the third step, the host data, with the embedded data, is further masked by a non-frequency mask, to ensure that the embedded data is indeed invisible within the host data. In the case of image data, the non-frequency mask is a spatial mask. Still other and further aspects, advantages and embodiments of the present invention will become apparent in the following description and by reference to the accompanying drawings.

DETAILED DESCRIPTION OF THE DRAWINGS
GENERAL OVERVIEW OF THE PRESENT INVENTION

Figure 1:
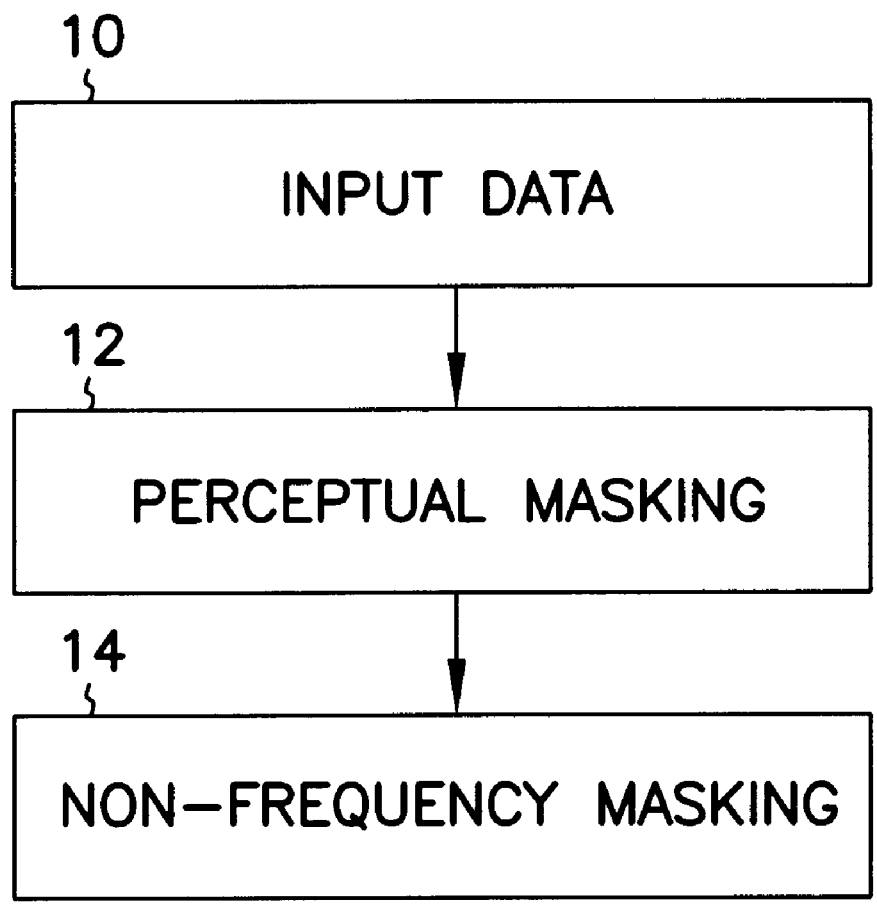
FIG. 1 is a flow chart of a method according to the present invention.

The present invention provides for the hiding of data, including watermarks, in human perceptible images. That is, the present invention provides for the hiding of data within host data, or watermarking host data. The host data is image data. Referring to FIG. 1, a method according to one embodiment of the invention is shown. In step 10, data is inputted. In the case of watermarking, this data is a signature, or watermark, that acts as a unique identifier for the host data, and which may be generated by the invention. In the case of embedding input data within the host data, this data is either the input data itself, or the input data as spread against a signature according to spread-spectrum techniques that are well known in the art. Spreading the signal provides for robustness of data. Without spreading the signal, the hidden data amasses towards the low end of the frequency spectrum; a filter applied to the entire data set that removes low frequencies may also remove the hidden data. Spreading the signal spreads the data over the entire frequency range. Note that in the case of watermarking the host data, the signature inherently is spread across the frequency spectrum without explicit spread-spectrum processing.

In one embodiment of the invention, the signature is a pseudo-noise (PN) sequence. These are used as codewords for the watermarks because of their noise-like characteristics, resistance to interference, and their good auto-correlation properties. PN-sequences are periodic noise-like binary sequences generated by length m linear shift registers. The maximum period of a PN-sequence is $2^m-1$. When the period is exactly $2^m-1$, the PN-sequence is called an m-sequence. In one embodiment, m-sequences are used to provide an easy way to generate a unique code for an author's identification. Furthermore, the period N auto-correlation function has peaks equal to 1 at 0, N, 2N, etc., and is approximately equal to 1/N, elsewhere. Because of these periodic peaks, an m-sequence is self-clocking. This allows synchronization with the embedded watermark during the detection process. It is also important if the signal is cropped and re-sampled.

In step 12, the data inputted in step 10 is embedded within the host data as dictated by a perceptual mask. A perceptual masking model is used to determine the optimal locations within the host data in which to insert the hidden data or watermark. The perceptual mask is specific to the host data being image data. The mask provides for the data inputted by step 10 to be embedded with the host data, at places typically imperceptible to the human eye. That is, the perceptual mask exploits masking properties of the human visual system. The perceptual masking of step 12 is conducted in the frequency domain.

Perceptual visual masking refers to a situation where a signal raises the visual threshold for other signals around it. The visual masking model is based on a frequency domain masking data in which a masking grating raises the visual threshold for signal gratings around the masking frequency. In one embodiment, the model used expresses the contrast threshold at frequency f as a function of f, the masking frequency $f_m$ and the masking contrast $c_m$:

$$c(f,f_m)=c_o(f)\cdot\text{Max}\{1,[f(f/f_m)c_m]^\alpha\},$$

where $c_o(f)$ is the detection threshold at frequency f. To find the contrast threshold c(f) at a frequency f in an image, a discrete cosine transform (DCT) is used to transform the image into the frequency domain and find the contrast at each frequency. Then, a summation rule of the form $$c(f)=[\Sigma f_m c(f,f_m)]^{1/\beta},$$

is used. If the contrast error at f is less than c(f), the model predicts that the error is invisible to human eyes.

In step 14, the host data, including the embedded input data or watermark, is further subject to a non-frequency mask. Because the perceptual mask in step 12 is a frequency domain mask, a further mask is necessary to ensure that the embedded data remains invisible in image host data. In the case of image host data, the non-frequency mask is a spatial mask.

With respect to image data, frequency masking effects are localized in the frequency domain, while spatial masking effects are localized in the spatial domain. Spatial masking refers to the situation that an edge raises the perceptual threshold around it. Any model for spatial masking can be used, and such models are well known in the art. However, the model used in one embodiment of the invention is similar to the model disclosed in "Low Bit Rate Near-Transparent Image Coding," in Proceedings of the SPIE International Conference on Wavelet Applications for Dual Use, vol. 2491, (Orlando, Fla), pp. 173–184 (1995), which is herein incorporated by reference, and which is based on a model proposed by Girod in "The Information Theoretical Significance of Spatial and Temporal Masking in Video Signals," in Proceedings of the SPIE Human Vision, Visual Processing, and Digital Display, vol. 1077, pp. 178–187 (1989), which is also herein incorporated by reference. In one embodiment, the upper channel of Girod's model is linearized under the assumption of small perceptual errors, the model giving the tolerable error level for each pixel in the image, as those skilled in the art can appreciate.

As have been described, steps 10, 12 and 14 of FIG. 1 provide a general overview of the present invention. Because, however, the invention varies particularly as to whether input data is being embedded into the host data, or whether a watermark is being embedded into the host data, the specifics of the implementation of the invention as to watermarking and hidden data embedding are now provided.

HARDWARE IMPLEMENTATION OF THE INVENTION

Figure 2:
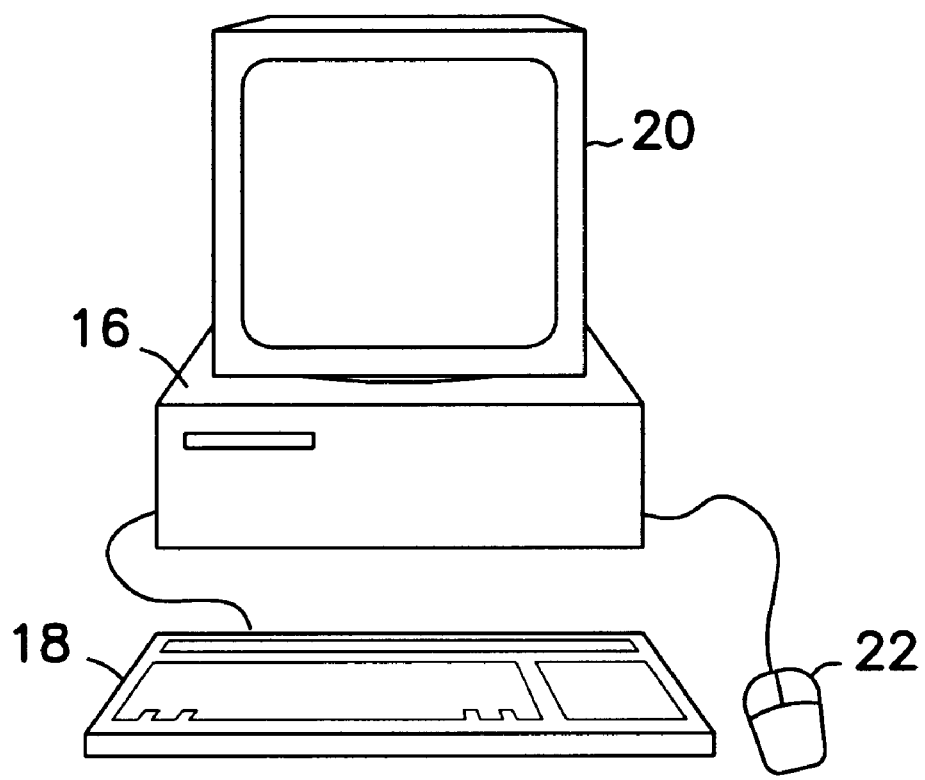
FIG. 2 is a diagram of a typical computer to be used with the present invention.

The present invention is not limited as to the type of computer on which it runs. However, a typical example of such a computer is shown in FIG. 2. Computer 16 is a desktop computer, and may be of any type, including a PC-compatible computer, an Apple Macintosh computer, a UNIX-compatible computer, etc. Computer 16 usually includes keyboard 18, display device 20 and pointing device 22. Display device 20 can be any of a number of different devices, including a cathode-ray tube (CRT), etc. Pointing device 22 as shown in FIG. 2 is a mouse, but the invention is not so limited. Not shown is that computer 16 typically also comprises a random-access memory (RAM), a read-only memory (ROM), a central-processing unit (CPU), a fixed storage device such as a hard disk drive, and a removable storage device such as a floppy disk drive. The computer program to implement the present invention is typically written in a language such as C, although the present invention is not so limited.

DATA HIDING WITHIN AN IMAGE HOST DATA

Figure 3:
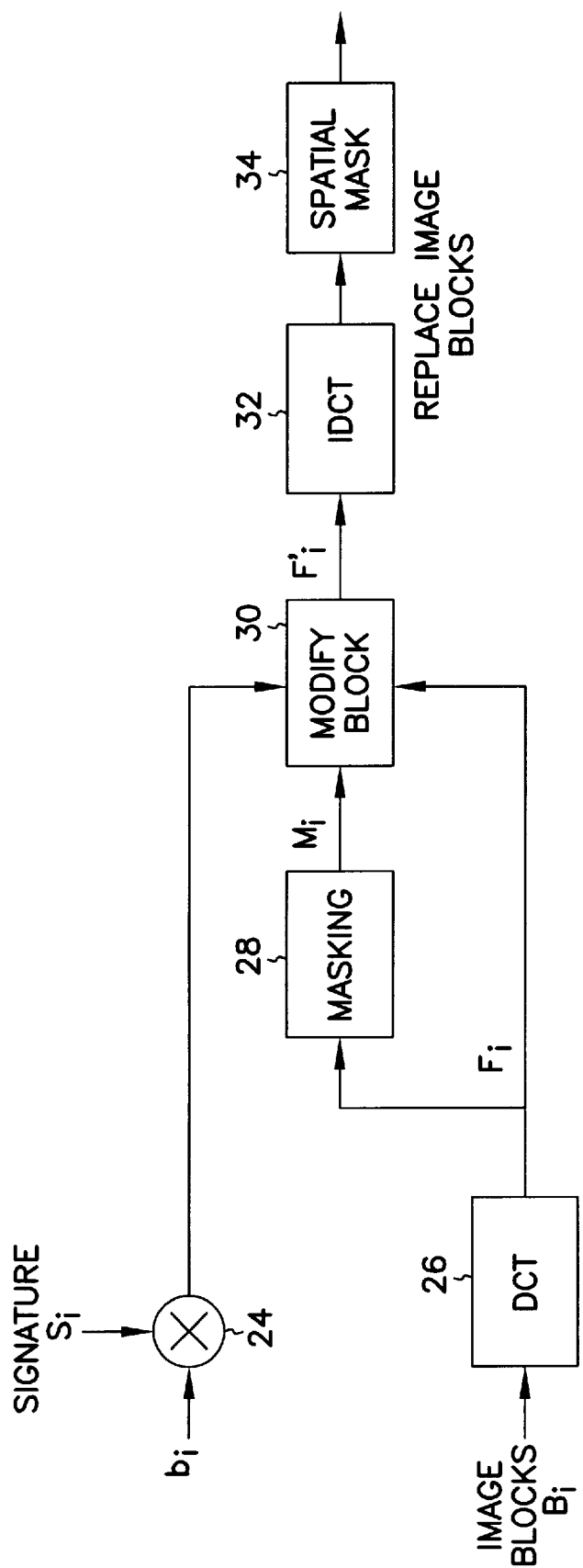
FIG. 3 is a flow chart of a method effectuating data hiding within an image using perceptual frequency masking and spatial masking according to the present invention; and, FIG. 4 is a flow chart of a method effectuating watermark generation for image data according to the present invention.

The embodiment shown in FIG. 3 illustrates the data hiding aspect of the present invention as it relates to host data that is an image. Referring now to FIG. 3, a block diagram of one embodiment of the invention, in which hidden data is embedded into an image by using a perceptual mask, is shown. As shown in the diagram, blocks $B_i$ of the image data (host data) are selected to embed the data $b_i$ which are first spread by signature $s_i$. The set of all data b is hidden one bit at a time in particular block B of the image data. The notation $b_i$ refers to the I bit of hidden data b, while the notation $B_i$ refers to the I block of host data B. Similarly, the notation $S_i$ refers to the I bit of signature S.

In step 24, data $b_i$ is spread by signature $S_i$. Data $b_i$ can be any type of data: caption information regarding the image; sound data regarding the image; etc. Signature $S_i$ can by any type of signature—for example, a pseudo-noise (PN) code as has been already described. Note that step 24 is not required under the present invention. Data b does not have to be spread in order for the invention to function correctly; without spreading against a signature S, those skilled in the art will understand that there is then an implicit "spreading" against a signature S having all 1 bits. However, spreading of the data B is preferable for robustness. In step 26, a discrete cosine transform (DCT) is applied to each block $B_i$ to form a DCT block $F_i$. That is, $F_i$ is the frequency domain equivalent of block $B_i$. Transforming the host data into the frequency domain is necessary in order to properly apply the perceptual mask according to the present invention.

In step 28, the perceptual mask is applied to each block $F_i$ to generate a masked block $M_i$ corresponding to $F_i$. The perceptual mask according to the present invention takes into account the human visual system so that the input data is embedded within the host data in a manner that makes the hidden data invisible within the host data. The invention is not limited to any particular perceptual mask; however, as has already been described in conjunction with the general overview of the invention, a particular perceptual mask for image data has been used. In the case (as is here) where the host data is image data, the perceptual model used is the model for image data, and reference to the discussion provided earlier should be made in order for further understanding thereto.

In step 30, a bit $b_i$ is hidden in block $F_i$ by modifying the DCT coefficients according the equation $$F_i'(j,k) = ([F_i(j,k)/M_i(j,k)] + (1/4) b_i S_i(j,k)) M_i(j,k),$$

where [·] denotes the rounding operation. In step 32, the original image blocks $B_i$ are replaced by the inverse DCT's of the modified blocks $F_i'$. Finally, in step 34, spatial masking is applied to the data. The invention is not limited to any particular spatial mask. One particular spatial mask for host data that is an image has already been described in conjunction with the general overview of the invention, and reference should be made to that discussion for further understanding thereto. Spatial masking ensures that the embedded data is indeed hidden (i.e., invisible) within the host data as examined by the human eye.

As has been described, the method shown in FIG. 3 provides for data embedding within an image according to a perceptual visual mask and a spatial mask. The method of FIG. 3 also provides for robust data embedding. Spreading the hidden data in step 24 ensures that a filter cutting off the low frequencies of the data will not corrupt the data. Furthermore, the method provides for invisible data embedding, in that the mask of step 28 is perceptual such that the data is then embedded in step 30 in places within the image which are imperceptible to the human eye. The spatial mask in step 34 complements the perceptual mask, and further ensures that the hidden data is invisible.

To add further robustness to the hidden data, the data hiding techniques may be modified to take into account certain signal processing operations. For example, if it is known that a JPEG coder will be applied to the image, the data hiding procedures can be modified appropriately. That is, the mask $M_i$ of step 28 may be preprocessed using the JPEG quantization table by substituting a new mask $M_i = Q * M_i$ for $M_i$, where Q is the estimated quality factor for the JPEG coder. This will help ensure that if the data is subjected to JPEG compression, the hidden data will remain embedded within the host data.

Those skilled in the art will recognize that the method shown in FIG. 3 is largely reversible such that extraction of the embedded data from an image having embedded data is possible. Given an image with (possibly modified) hidden data blocks $F_i''$, the data bit $b_i$ may be recovered by forming the difference $$\hat{b}_i = \sum_{j,k} M_i'(j,k) \, sgn \left( \frac{F_i''(j,k)}{M_i'(j,k)} - \left[ \frac{F_i''(j,k)}{M_i'(j,k)} \right] \right)$$

where $M_i'$ is the frequency mask estimated by the receiver times the signature $S_i$, i.e., $M_i' = M_i^{est} * S_i$, and sgn(·) is the sign value. The bit decision for block $B_i$ is weighted by the mask $M_i'$. The bit error rate (BER) of this scheme is zero when no distortion is present in the received image. A simple expression for the upper bound of the BER when zero mean Gaussian noise with variance $\sigma^2$ is added to the signal can be derived. Without loss of generality, assume that $b_i = 1$. A decision error occurs for coefficient $F''(j,k)$ whenever the magnitude of a noise sample $|w(j,k)|$ falls in one of the intervals $$\left[ \frac{(4n+1)M(j,k)}{4}, \frac{(4n+3)M(j,k)}{4} \right] = I_n$$

for n=0, 1, 2, . . . . Using the complementary error function er fc(·), the probability of error for coefficient $F''(j,k)$ may be written as $$P_e(F''(j,k), \sigma) = 2 \sum_{n=0}^{\infty} er \, fc\left(\frac{I_n}{\sigma}\right).$$

For $\sigma$ fixed, $P_e(F''(j,k), \sigma)$ decreases as $M(j,k)$ increases. Therefore, the receiver places more weight on coefficients with large masking values. The overall probability of error for bit $b_i$ is a weighted combination of the $P_e(F''(j,k), \sigma)$ in block $B_i$.

WATERMARK GENERATION FOR IMAGE HOST DATA

Figure 4:
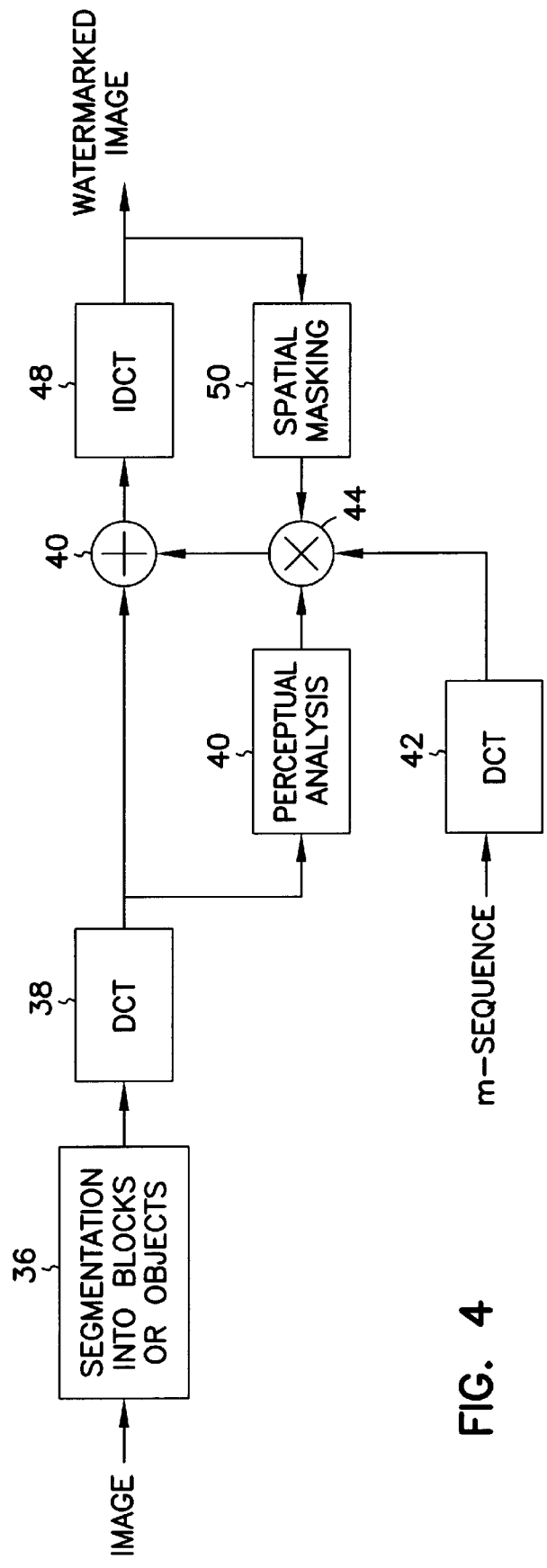

The embodiment shown in FIG. 4 illustrate the watermark generation aspect of the present invention as it relates to host data that is an image. Referring now to FIG. 4, a block diagram of one embodiment of the invention, in which a watermark is embedded into an image by using a perceptual mask, is shown. In step 36, the image data is segmented into blocks. Using a traditional approach, the blocks may be n×n (e.g., 8×8 like JPEG). An option at this stage is to segment the image into blocks of objects and texture regions, as opposed to square blocks of data. In either case, blocking the image adds detection robustness to cropping and localized signal processing operations. In step 38, a discrete cosine transform (DCT) is applied to each block. This transform the data into the frequency domain, where perceptual masking is conducted.

A perceptual frequency mask is then computed for each block in step 40. The perceptual mask according to the present invention takes into account the human visual system so that the watermark is embedded within the host data in a manner that makes the watermark invisible within the host data. The invention is not limited to any particular perceptual mask; however, as has already been described in conjunction with the general overview of the invention, a particular perceptual mask for image data has been used. In the case (as is here) where the host data is image data, the perceptual model used is the model for image data, and reference to the discussion provided earlier should be made in order for further understanding thereto.

In step 42, the unique signature, or watermark, is also transformed into the frequency domain by DCT. The signature can be of any type, such as a pseudo-noise (PN) code, as has already been described. In particular, the signature may be a type of PN code known as an m-sequence, as has also already been described. Note that a different signature sequence is used for each image block. In step 44, the resulting mask of step 40 is multiplied with the DCT of the signature resulting from step 42. In addition, the mask of step 40 is also scaled by the spatial mask of step 50, as will be described. In step 46, the watermarked and scaled mask resulting from step 44 is added to the corresponding DCT block resulting from step 38. The watermarked image is then obtained by assembling the inverse DCT's of each block in step 48.

This watermarked imaged is spatially masked in step 50 to scale the mask multiplied by the DCT of the signature in step 44. The spatial model is used to verify that the watermark designed with the frequency masking model is invisible for local spatial regions. The invention is not limited to any particular spatial mask. One particular spatial mask for host data that is an image has already been described in conjunction with the general overview of the invention, and reference should be made to that discussion for further understanding thereto. In this model, each watermark coefficient is compared with the tolerable error level obtained to assure that it is invisible. A visible watermark is rescaled via a weighting factor.

As has been described, the method shown in FIG. 4 provides for watermarking an image according to a perceptual visual mask and a spatial mask. The method of FIG. 4 also provides for robust watermarking. Furthermore, the method provides for invisible watermarking, in that the mask of step 40 is perceptual such that the watermark is embedded in step 44 in places within the image which are imperceptible to the human eye. The spatial mask in step 50 complements the perceptual mask, and further ensures that the input data is invisible.

The watermark embedded within the image data according to the method of FIG. 4 should be extractable even if common signal processing operations are applied to the host image. This is particularly true in the case of deliberate unauthorized attempts to remove the watermark. For example, a pirate may attempt to add noise, filter, code, re-scale, etc., an image in an attempt to destroy the watermark. The embedded watermark, however, is noise-like and its location over multiplied blocks of the data is unknown. Therefore, the pirate has insufficient knowledge to directly remove the watermark. Furthermore, a different signature is used for each block to further reduce unauthorized watermark removal by cross-correlation. Therefore, any destruction attempts are done blindly.

To detect whether a watermark is within a host image data, the author of the image has access of the original signal S (that is, the original host data), and the signature. Detection of the watermark is accomplished via hypothesis testing:

$H_0: X = R - S = N$ (No watermark)
$H_1: X = R - S = W' + N$ (Watermark)

where R is the potentially pirated signal, W' is the potentially modified watermark, and N is noise. The correct hypothesis is obtained by applying a correlating detector on X with W and comparing with a threshold. In some cases, e.g., spatial resealing, a generalized likelihood ratio test must be applied.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

We claim:

1. A computerized method for embedding inputdata into host data representing a human-perceptible image comprising:

inputting the input data;

embedding the input data into the host data in accordance with a perceptual mask conducted in the frequency domain; and, further wherein the input data is embedded in the host data in accordance with a perceptual mask in a domain other than the frequency domain.

2. The computerized method of claim 1, wherein the input data embedded into the host data comprises data representing a watermark acting as a unique identifier for the host data.

3. The computerized method of claim 2, wherein the watermark comprises a pseudo-noise (PN) sequence.

4. The computerized method of claim 1, wherein the input data embedded into the host data comprises data spread against data representing a signature according to a spread-spectrum technique.

5. The computerized method of claim 4, wherein the signature comprises a pseudo-noise (PN) sequence.

6. The computerized method of claim 1, wherein the perceptual mask comprises a model in which a contrast threshold at a frequency f is expressed as a function of the frequency f, a masking frequency $f_m$ and a masking contrast $c_m$, $$c(f, f_m) = c_o(f) \cdot \text{Max}\{1, [f(f/f_m)c_m]^{\alpha}\},$$

where $c_o(f)$ is a detection threshold at the frequency f.

7. The computerized method of claim 1, wherein the non-frequency mask comprises a spatial mask.

8. A computerized system for hiding input data having a plurality of bits within a host data representing a human-perceptible image comprising:

a processor;

a computer-readable medium;

computer-executable instructions executed by the processor from the computer-readable medium comprising;

segmenting the host data into a plurality of blocks;

applying a discrete cosine transform (DCT) to each block of the host data to generate a frequency block corresponding to the block of host data;

applying a perceptual mask to each frequency block;

embedding each bit of the input data into a corresponding frequency block; and, applying and inverse DCT to each frequency block to generate the host data having the put data embedded therein.

9. The computerized system of claim 8, wherein the instructions further comprise spreading each bit of the input data by a signature after selecting a plurality of blocks of the host data.

10. The computerized system of claim 8, wherein the instructions further comprise applying a spatial mask to the host data having the input data embedded therein.

11. A computer-readable medium having a computer program stored thereon to cause a suitably equipped computer to perform the method comprising:

segmenting host data representing a human-perceptible image into a plurality of blocks;

spreading each of a plurality of bits of input data by a signature after selecting a plurality of blocks of the host data;

applying a discrete cosine transform (DCT) to each block of the host data to generate a frequency block corresponding to the block of host data;

applying a perceptual mask to each frequency block;

embedding each bit of the input data, as spread by the signature, into a corresponding frequency block;

applying an inverse DCT to each frequency block to generate the host data having the input data embedded therein; and, applying a spatial mask to the host data having the input data embedded therein.

12. The computer-readable medium of claim 11, wherein the medium is a floppy disk.

13. A computerized system for embedding a watermark into a host data representing a human-perceptible image comprising:

a processor;

a computer-readable medium;

computer-executable instructions executed by the processor for the computer-readable medium comprising:

segmenting the host data into a plurality of blocks;

applying a discrete cosine transform (DCT) to each block of the host data to generate a frequency block corresponding to the block of host data;

applying a perceptual mask to each frequency block;

applying the DCT to each bit of a plurality of bits of the watermark;

scaling each frequency block, as to which the perceptual mask has been applied, by a corresponding bit of the watermark, as to which the DCT has been applied, and by a spatially masked block corresponding to the frequency block, to generate an adder block corresponding to the frequency block;

adding each frequency block with the adder block corresponding to the frequency block;

applying an inverse DCT to each frequency block as has been added to with the adder block corresponding to the frequency block to generate a watermarked block of the host data corresponding to the frequency block; and, applying a spatial mask to each watermarked block to generate the spatially masked block corresponding to the frequency block to which the watermarked block corresponds;

embedding each bit of the input data into a corresponding frequency block; and, applying an inverse DCT to each frequency block to generate the host data having the input data embedded therein.

14. A computer-readable medium having a computer program stored thereon to cause a suitably equipped computer to perform the method comprising:

segmenting host data representing a human-perceptible image into a plurality of blocks;

applying a discrete cosine transform (DCT) to each block of the host data to generate a frequency block corresponding to the block of host data;

applying a preceptual mask to each frequency block;

applying the DCT to each bit of a plurality of bits of a watermark;

scaling the each frequency, as to which the perceptual mask has been applied, by a corresponding bit of the watermark, as to which the DCT has been applied, and by a spatially masked block corresponding to the frequency block, to generate an adder block corresponding to the frequency block;

adding each frequency bock with the adder block corresponding to the frequency block;

applying an inverse DCT to each frequency block as has been added to with the adder block corresponding to the frequency block to generate a watermarked block of the host data corresponding to the frequency block; and, applying a spatial mask to each watermarked block to generate the spatially masked block corresponding to the frequency block to which the watermarked block corresponds;

embedding each bit of the input data into a corresponding frequency block; and applying an inverse DCT to each frequency block to generate the host data having the input data embedded therein.

15. The computer-readable medium of claim 14, wherein the computer-readable medium is a floppy disk.

16. The method according to claim 1 wherein the data is processed according to the perceptual mask in the frequency domain prior to being processed according to the mask conducted in the non-frequency domain.

17. The method according to claim 1 further including producing frequency masking thresholds from processing of the host data.

18. The method according to claim 1 further including producing masking thresholds for the non-frequency domain from processing of the host data.

19. The method according to claim 17 wherein the data to be embedded is adjusted according to the frequency masking thresholds.

20. The method according to claim 18 wherein the data to be embedded is adjusted according to the non-frequency masking thresholds.

21. The method according to claim 20 wherein the data to be embedded is first adjusted using the frequency masking thresholds.

22. The method according to claim 1 wherein the perceptual mask in the non-frequency domain is processed prior to the perceptual mask in the frequency domain.

23. The method according to claim 18 further wherein the non-frequency domain is the spatial domain, and the masking thresholds are spatial thresholds.

* * * * *